June 11, 1940.  E. J. DOBERSTEIN  2,204,344
CUTTER CHAIN
Filed Aug. 3, 1938
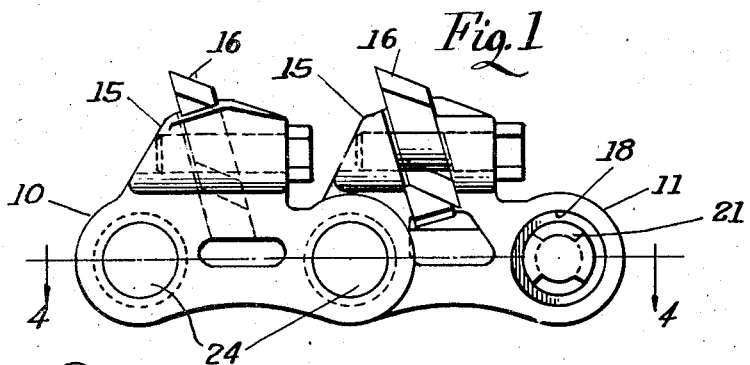
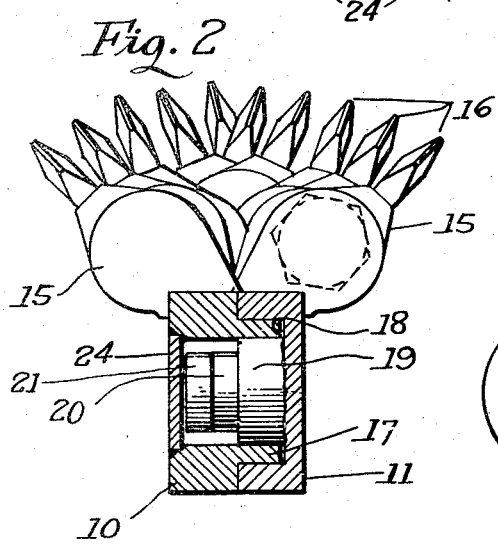
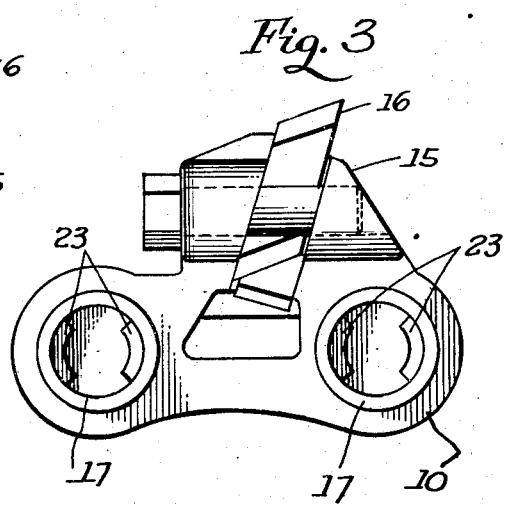
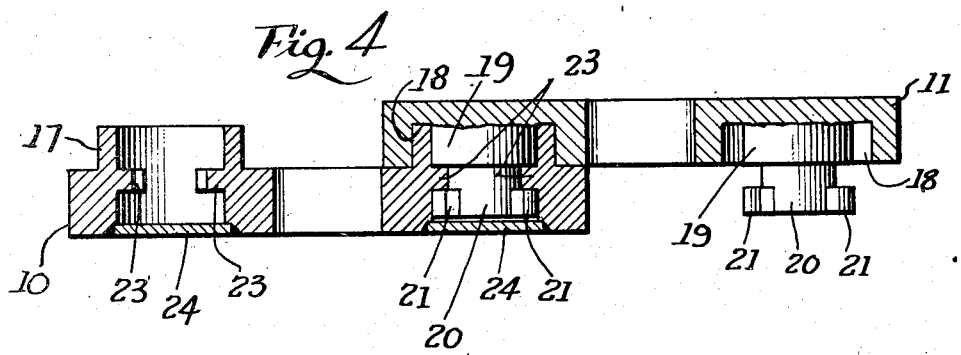
Inventor
Edward J. Doberstein
Clarence T. Poole
Attorney Patented June 11, 1940

2,204,344

UNITED STATES PATENT OFFICE 2,204,344

CUTTER CHAIN

Edward J. Doberstein, Blue Island, Ill., assignor to Goodman Manufacturing Company, Chicago, Ill., a corporation of Illinois Application August 3, 1938, Serial No. 222,749

12 Claims. (Cl. 74—252)

This invention relates to improvements in cutter chains for mining machines.

Heretofore, the links of mining machine cutter chains have usually been connected together by rivets or other similar connecting means, which form a pivotal bearing between the links, or which extend through bushings forming this bearing. With such a connection, a great amount of time is lost in taking the chain apart for repairing it and in assembling the repaired chain. Also, due to the great strains to which the chain is subjected when cutting, difficulty has been encountered in providing a large enough bearing area between the links to prevent their tendency to twist in a plane transverse to their plane of travel and thus separate, and to prevent the rivets or connecting means from loosening in the chain or pulling out. This is particularly true of chains or the strapless type, which eliminate the use of parallel connecting straps for connecting the links carrying the cutter chain blocks together. These strapless chains are usually arranged with the links in staggered relation with respect to each other which requires that the bearing connection between the links be an overhanging or cantilever bearing connection. An increase in the bearing area to a size large enough to prevent this separation of the chain links would reduce the stock in the chain strap to such an extent as to weaken the strength of the chain to an undesirable extent.

The principal object of my invention is to remedy these difficulties by providing a cutter chain for mining machines having a novel form of quick detachable pivotal bearing connection between adjoining links of the chain so arranged as to eliminate the usual connecting parts between the links; such as, rivets, machine screws or bushings, and to provide a connection between adjacent links of the chain which affords an increased pivotal bearing area between the links of the chain and reduces the tendency of the links to spread or separate in a direction transverse to their plane of travel.

Other objects of my invention will appear from time to time as the following specification proceeds, and with reference to the accompanying drawing, wherein:

Figure 1 is a view in side elevation of two interconnected links of a cutter chain constructed in accordance with my invention;

Figure 2 is an enlarged end view of a cutter chain constructed in accordance with my invention, with certain parts of the links shown in transverse section;

Figure 3 is a detail view of one of the cutter chain links drawn to a slightly smaller scale than Figure 2; and Figure 4 is an enlarged sectional view taken substantially along the line 4—4 of Figure 1.

In the drawing, the embodiment of my invention illustrated consists of a cutter chain of the endless type which includes a plurality of links 10 and 11 pivotally connected together adjacent their ends in a manner which will hereinafter be more clearly described as this specification proceeds.

The cutter chain is adapted to be guided in a channeled guide formed about a cutter bar (not shown) and as herein shown is of the gibless and strapless type; that is, no means is provided for retaining the chain in the channeled guide of the cutter bar except the tension of the chain itself, and each link of the chain carries a cutter bit, the use of connecting straps between the links carrying the bits being eliminated.

The links 10 and 11 are herein shown as being pivotally connected together in staggered or offset relation with respect to each other in order to keep down the thickness of the chain; that is, when the chain is arranged to cut in a horizontal plane, one link has two other links abutting its upper surface and pivotally connected to opposite ends thereof. These adjoining links in a like manner have their undersurfaces abutted by corresponding chain links and pivotally connected together, leaving a space in the channeled guide of the cutter bar between alternate links to enable the chain to clear debris from the cutter bar.

Each link 10 and 11 is provided with an integrally formed bit holding lug or block 15 on the outer end thereof which forms a means for holding a cutter bit 16. As herein shown, the cutter bit 16 is relatively short and is so formed that each of its ends define a cutting point so that it may be reversed when one end thereof is dull and thrown away both ends are dull.

Each bit holding block 15 projects outwardly from the center of the respective link 10 at an angle which varies with respect to the plane of travel of the chain, as may clearly be seen with reference to Figure 2, to hold the cutter bits in various angular positions with respect to each other throughout the chain and arrange said bits to completely cut a kerf or groove in the coal face of sufficient width to clear the cutter bar about which the chain travels.

The detailed construction of the blocks 15 and the means for holding the bits therein is similar to that shown in a prior application Serial No.

220,165, filed by Thomas E. Pray on July 20, 1938, and is no part of my present invention so need not be described herein.

Referring now in particular to the novel form of detachable pivotal bearing and locking connection between the cutter links 10 and 11, the link 10 is provided with an annular flange or bearing member 17 which projects outwardly from one side thereof and which is herein shown as being integral therewith. Said bearing member forms an overhanging bearing for the link 11 and is adapted to engage an annular recess 18 formed in an adjacent end of said link.

It should herein be noted that the bearing area formed by the inner and outer peripheries of this bearing member affords a pivotal bearing connection between the links, which is considererably larger than could be obtained by an overhanging bushing or rivet without materially weakening the chain links or increasing their size to an undesirable extent.

An interlocking connection is provided between said links which includes a stud 19 herein shown as being formed integral with said link. The outer periphery of the inner portion of said stud defines the inner wall of the annular recess 18. Said stud is provided with a projecting retaining portion 20 of a reduced diameter, which projects outwardly from the side of the link 11 and has a pair of oppositely disposed lugs 21, 21 projecting laterally from the outer end thereof. Said lugs are herein shown as being in the form of segments of an annulus.

The walls defining the inner periphery of the annular bearing member 17 are herein shown as extending through the link 10 to form an aperture which extends therethrough. A plurality of oppositely disposed retaining lugs 23, 23 are disposed within the limits of the link 10 and extend inwardly from the aperture defined by the inwardly extended inner walls of said annular bearing member. Said lugs are disposed adjacent the side of the link from which the bearing member 17 extends. Sufficient space is provided between the inner sides of said lugs and the side of said link opposite said bearing member to permit the lugs 21, 21 to pass through the spaces formed between said lugs and be recessed within said link, and have locking and sliding engagement with said first mentioned lugs when the links are turned with respect to each other, as may be clearly seen with reference to Figure 4. Said last mentioned lugs are likewise formed in the shape of segments of an annulus and are of substantially the same size and form as the lugs 21, 21.

A closure member 24 is provided for closing the end of the aperture defined by the inner walls of the bearing member 17, opposite from said bearing member, which is herein shown as being a plate welded to said walls. This closure member prevents dirt from entering said aperture and permits the joint between the links to be packed with grease or any other form of lubricating material, and thus provides a grease tight bearing connection between adjoining links of the chain.

It will be obvious from the foregoing that the links 10 and 11 are connected together by engagement of the bearing member 17 with the annular recess 18, and by so turning said links with respect to each other that the lugs 21, 21 will pass through the spaces formed between the lugs 23, 23, and by then turning said links so that the lugs 21, 21 and 23, 23 will have sliding engagement for locking said links for independent pivotal movement with respect to each other. In order to disconnect said links, one must be turned ninety degrees with respect to the other from an aligned position. When so turned, the lugs 21, 21 will pass through the spaces between the lugs 23, 23 and the links may then readily be pulled apart and separated in an obvious manner. It should be noted that since the arc about which the cutter chain turns is relatively large compared with the size of the chain that, when once locked in connected relation, the chain will always be connected unless manually disconnected.

It may be seen from the foregoing that a new and improved form of connection between a pair of cutter chain links has been provided which provides a positive quick detachable connection between the links of the chain, eliminating the use of rivets and providing a larger bearing area between the links than has formerly been provided, in a simplified and novel manner.

It may further be seen that this connection is so arranged as to provide a simple, efficient and economical means to prevent twisting movement of the links of the cutter chain in a direction transverse to the plane of travel of the cutter chain and the resultant separation thereof, and to provide a dust and grease tight bearing connection between said links.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. An endless chain including a plurality of chain links, and a pivotal bearing connection between adjacent links of said chain including an annular recess formed in one of said links, an annular bearing member projecting from another of said links and adapted to have pivotal bearing engagement with said recess, a retaining member projecting from said link having said recess formed therein and having an interengaging member projecting laterally therefrom, the wall defining the inner periphery of the annular bearing member of said other link extending within said link to form a recess therein, and an interengaging member extending inwardly from said wall and adapted to be slidingly and lockingly engaged with said other interengaging member.

2. In a cutter chain for mining machines, a plurality of chain links and a pivotal readily detachable overhanging bearing connection between said links including an annular recess formed in one of said links, an annular bearing member projecting from said other link and adapted to engage said recess, and interengaging elements projecting from a side of one of said links and adapted to be recessed within another of said links and have engagement with corresponding interengaging elements within said other link, for holding said links in connected relation with respect to each other.

3. In a cutter chain for mining machines, a plurality of chain links and a pivotal bearing connection between said links including an annular recess formed in one of said links, an annular bearing member projecting from another of said links and adapted to have bearing engagement with said recess, a retaining member projecting from said link having said recess formed therein and having a pair of lugs projecting in opposite directions therefrom, the walls defining the inner periphery of the annular bearing member of said other link extending within said link to form a recess therein, and a pair of lugs extending inwardly from said walls, within the limits of said link, adapted to be slidably and lockingly engaged with said lugs projecting from said retaining member.

4. In a cutter chain for mining machines, a plurality of chain links, and means for pivotally connecting said links together including an annular recess formed in one of said links, an annular bearing member projecting from an end of another of said links, and adapted to have bearing engagement with said recess, integrally formed outwardly projecting lugs spaced laterally from a side of said first mentioned link and having an outer periphery which is within the extended limits of the inner walls of said recess, and integrally formed internally projecting lugs disposed within said other link and adapted to be slidably engaged by said other lugs to form a locking joint between said links and permit pivotal movement of said links with respect to each other and permit quick separation or connection thereof but prevent lateral movement of said links with respect to each other when in connected relation with respect to each other.

5. In a cutter chain for mining machines, a plurality of chain links, and means for pivotally connecting said links together including annular recesses formed in opposite ends of certain links of said chain, annular bearing members projecting from opposite ends of alternate links of said chain and adapted to have bearing engagement with said recesses, interengaging portions having an outer periphery within the extended limits of the inner walls of the recessed portions of said links but which are spaced from the sides of said links, and interengaging portions disposed within the limits of said other links and adapted to be slidably engaged by said first mentioned interengaging portions for holding the links of the chain in connected relation with respect to each other, but permitting pivotal movement of said links with respect to each other.

6. In a cutter chain for mining machines, a plurality of chain links, and means for pivotally connecting said links together including annular recesses formed in opposite ends of certain links of said chain, integrally formed annular bearing members projecting from opposite ends of alternate links of said chain and adapted to have bearing engagement with said recesses, integrally formed interengaging lugs spaced outwardly from the sides of said first mentioned links and having an outer periphery which would be within the limits of the recessed portions of said links if extended, and integrally formed inwardly projecting lugs disposed within the limits of said other links and adapted to have slidable engagement with said other lugs to permit pivotal movement of said links with respect to each other and quick separation or connection thereof, but prevent lateral movement of said links with respect to each other when in connected relation with respect to each other.

7. In a cutter chain for mining machines, a plurality of chain links and a pivotal bearing connection between said links including an annular recess formed in one of said links, an annular bearing member projecting from another of said links and adapted to have bearing engagement with said recess, a retaining member projecting from said link having said recess formed therein and having a pair of lugs projecting in opposite directions therefrom, the walls defining the inner periphery of the annular bearing member of said other link extending within said link to form an aperture extending therethrough, and a pair of lugs extending inwardly from said walls and adapted to be slidably and lockingly engaged with said lugs projecting from said retaining member, and means closing the aperture formed by the walls defining the inner periphery of the annular bearing member of said other link and forming a dust and grease tight connection between said links.

8. In a cutter chain for mining machines, a plurality of chain links, said links being arranged in staggered relation with respect to each other so that one link has two other links pivotally connected to one side thereof, and a pivotal readily detachable overhanging bearing connection between said links including an annular recess formed in one of said links, an annular bearing member projecting from a side of an adjoining link and adapted to have bearing engagement with said recess, and interengaging elements having sliding locking engagement with each other for holding said links in connected relation with respect to each other and permitting pivotal movement thereof, including interengaging elements projecting from a side of one of said links and adapted to be recessed within another of said links when said links are pivotally connected together and other interengaging elements disposed within the boundaries of said other link and adapted to be slidably engaged by said first mentioned interengaging elements.

9. In a cutter chain for mining machines, a plurality of chain links, said links being arranged in staggered relation with respect to each other so that one link has two other links pivotally connected to one side thereof, and a pivotal readily detachable overhanging bearing connection between said links including an annular recess formed in one of said links, an annular bearing member projecting from a side of an adjoining link and adapted to have bearing engagement with said recess, and a retaining member projecting from a side of said link having said recess formed therein and having a pair of lugs projecting in opposite directions therefrom, the walls defining the inner periphery of the annular bearing member of said other link extending within the boundaries of said link to form a recess therein, and a pair of lugs disposed within said recess and extending inwardly from said walls, said last mentioned lugs being adapted to be slidably and lockingly engaged by said first mentioned lugs to lock said links from lateral movement with respect to each other and permit pivotal movement of said links with respect to each other.

10. In a cutter chain for mining machines, a plurality of chain links, said links being arranged in staggered relation with respect to each other so that one link has two other links pivotally connected to one side thereof, and a pivotal readily detachable overhanging bearing connection between said links including annular recesses formed in opposite ends of certain links of said chain, annular bearing members projecting from opposite ends of alternate links of said chain and adapted to have bearing engagement with said recesses, interengaging lugs spaced outwardly from the sides of said first mentioned links and having portions spaced laterally from the sides of the links of said chain having said recesses formed therein, in overhanging relation with respect thereto, the outer boundaries of which are within the extended limits of the inner walls of the recessed portion of said links, and other interengaging lugs disposed within the limits of said other links, said last mentioned lugs being adapted to be slidably engaged by said first mentioned interengaging lugs for holding the links of said chain in connected relation with respect to each other, but permitting pivotal movement of said links with respect to each other.

11. In a cutter chain for mining machines, a plurality of chain links, said links being arranged in staggered relation with respect to each other so that one link has two other links pivotally connected to one side thereof, and are pivotal readily detachable overhanging bearing connection between said links including annular recesses formed in opposite ends of alternate links of said chain, integrally formed annular bearing members projecting from opposite ends of alternate links of said chain and adapted to have bearing engagement with said recesses, integrally formed interengaging lugs spaced outwardly from the sides of said first mentioned links and having an outer periphery which would be within the limits of the recessed portions of said links if extended, and integrally formed inwardly projecting lugs disposed within the limits of said other links and adapted to have slidable engagement with said other lugs to permit pivotal movement of said links with respect to each other and quick separation or connection thereof, but prevent lateral movement of said links with respect to each other when in connected relation with respect to each other.

12. In a cutter chain for mining machines, a plurality of chain links, said links being arranged in staggered relation with respect to each other so that one link has two other links pivotally connected to one side thereof, and a pivotal readily detachable overhanging bearing connection between said links including an annular recess formed in one of said links, an annular bearing member projecting from an adjoining link and adapted to have bearing engagement with said recess, and a retaining member projecting from said link having said recess formed therein and having a pair of lugs projecting in opposite directions therefrom, the walls defining the inner periphery of the annular bearing member of said other link extending through said link to form an aperture extending therethrough, and a pair of lugs extending inwardly from said walls within the limits of said link, said last mentioned lugs being adapted to be slidably and lockingly engaged by said first mentioned lugs to lock said links from lateral movement with respect to each other, and means closing the aperture formed by the walls defining the inner periphery of the annular bearing member of said other link and forming a dust and grease tight connection between said links.

EDWARD J. DOBERSTEIN.